Dec. 24, 1929.  J. NEUMANN  1,740,619
TROLLEY WHEEL
Filed Oct. 26, 1927
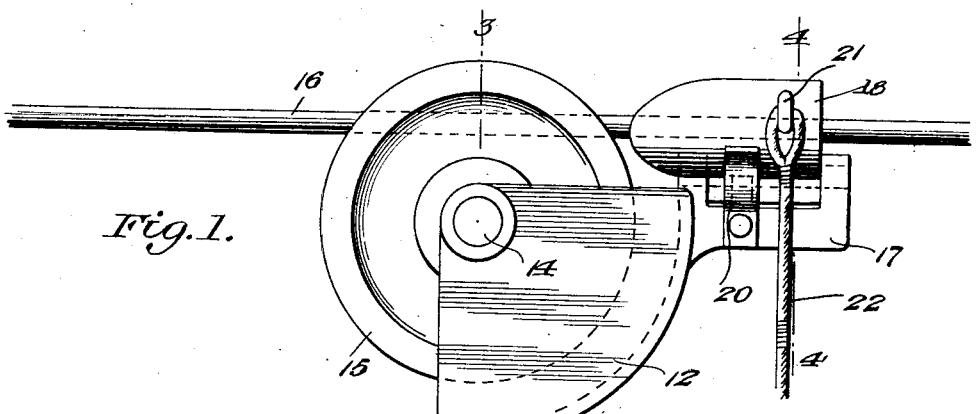
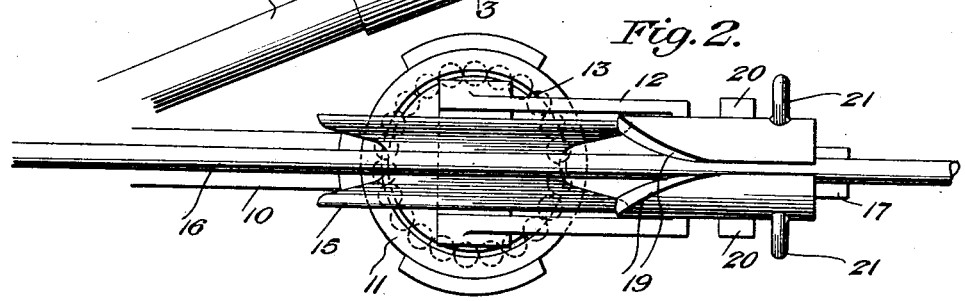
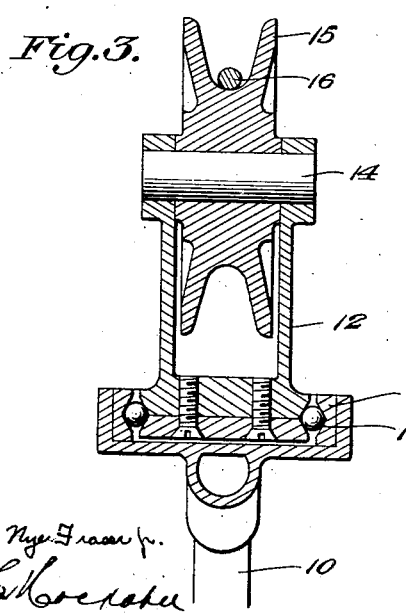
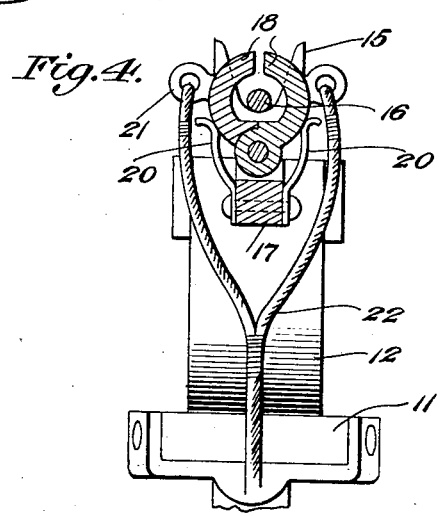
Josef Neumann
INVENTOR
BY Victor J. Evans
ATTORNEY Patented Dec. 24, 1929

1,740,619

UNITED STATES PATENT OFFICE

JOSEF NEUMANN, OF MILWAUKEE, WISCONSIN

TROLLEY WHEEL

Application filed October 26, 1927. Serial No. 228,938.

This invention relates to improvements in trolley wheels for electric railroads and has for an object the provision of means for yieldingly holding the wheel upon the wire in a manner to prevent accidental displacement, yet permit the wheel to readily pass insulators and switches.

With the above and other objects in view, the invention includes a trolley arm having a wheel carrying bracket or member swiveled thereon, the said bracket having means mounted thereon for guiding the wheel and holding the same in contact with the trolley wire.

In the drawings:—

Figure 1 is a side elevation of the invention.
Figure 2 is a plan view of the same.
Figure 3 is a vertical sectional view on the line 3—3 of Figure 1.
Figure 4 is an enlarged section on the line 4—4 of Figure 1.

Referring in detail to the drawings, wherein like characters of reference denote corresponding parts, the reference character 10 indicates a portion of a trolley arm having at its upper end a member 11, while swiveled upon this member is a bracket or shell 12. The bracket or shell 12 is connected with the member 11 in a manner to permit of horizontal rotary movement, the swivel connection being indicated at 13.

The shell or bracket 12 is substantially segmental in side view and mounted within this shell or bracket upon an axle or shaft 14 is a trolley wheel 15 which may be of the usual or any preferred construction, the wire with which the wheel 15 engages being shown at 16. Extending from the shell or bracket 12 at the upper end thereof is a supporting member 17 upon which is hinged a pair of transversely curved members 18. These members have their ends adjacent the wheel 15 curved outwardly as shown at 19 and are adapted to receive and provide a guide for the trolley wire 16. The inward movement of the members 18 is limited so as to prevent the said members from tightly gripping the wire 16, while they are yieldingly held against outward movement by means of a spring 20. The construction of these members permits them to readily pass the usual insulators which support the trolly wire, while their yielding action enables them to spread so as to pass the trolley wire switches and again contract to provide a guide for the trolley wheel. Each of the members has secured near its upper edge a ring 21, to which branches of a rope or cable 22 may be secured. This provides means for spreading the members 18 when placing the wheel upon the wire. As the wheel guide which is formed by the members 18 is rigidly secured to the shell or bracket 12 and the wheel 15 mounted within said bracket, the pivotal movement of these elements will be simultaneous and the wheel will be so guided as to prevent its accidental disengagement from the wire.

The invention is susceptible of various changes in its form, proportions and minor details of construction and the right is herein reserved to make such changes as properly fall within the scope of the appended claims.

Having described the invention what is claimed is:—

1. A trolley comprising an arm, a wheel carried thereby and capable of horizontal swinging movement and a guide movable with said wheel, said guide including a pair of transversely curved members hingedly connected at their lower edges at a point in direct vertical alignment below the trolley and adapted to receive the trolley wire and means for yieldingly holding the hinged members against outward movement and a cable connected with the curved members above their hinged connection.

2. A trolley comprising an arm, a wheel carried thereby and capable of horizontal swinging movement, a bracket carried by the trolley and disposed below and substantially parallel with the trolley wire, a hinge pin carried by and extending longitudinally of the bracket, a pair of transversely curved members adapted to receive the wire and having their lower edges hingedly mounted upon said pin, means to yieldingly hold the curved members against outward movement, and means to move said members outwardly.

In testimony whereof I affix my signature.

JOSEF NEUMANN.